L. B. PARKS.
Broiler-Furnace.
No. 223,680.    Patented Jan. 20, 1880.
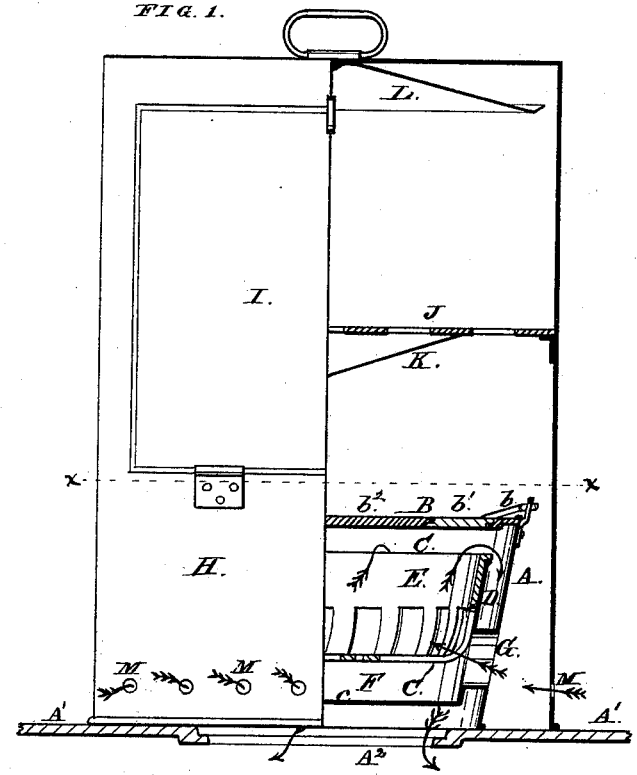
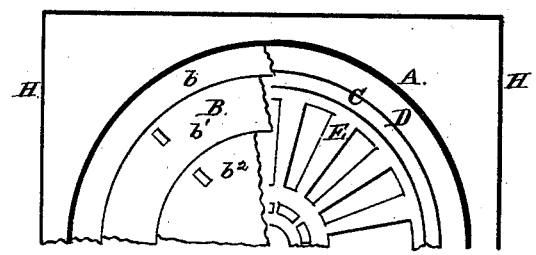

UNITED STATES PATENT OFFICE.

LYMAN B. PARKS, OF ST. LOUIS, MISSOURI, ASSIGNOR TO THOMAS K. KELLY, OF SAME PLACE.

BROILER-FURNACE.

SPECIFICATION forming part of Letters Patent No. 223,680, dated January 20, 1880.

Application filed April 24, 1879.

*To all whom it may concern:*

Be it known that I, LYMAN B. PARKS, of the city of St. Louis, in the State of Missouri, have invented a certain new and useful Improvement in Broiler-Furnaces, &c., of which the following is a full, clear, and exact description, reference being had to the accompanying drawings, forming part of this specification.

My improvement consists in a fire-basket set in a close-bottomed pan supported in a case of larger dimensions than the pan, so as to leave a flue-space between them for the descent of smoke and gases.

The air for the support of combustion enters the pan beneath the fire-basket through pipes extending through the case and the side of the pan.

My improvement also consists in an outer case surrounding the parts described, and containing in its upper part an oven with a deflector beneath the slide or shelf to deflect the ascending heated currents outward, and a reflector beneath the top, made concave, to concentrate the heat upon the shelf.

Figure 1 is half in front view and half in axial section, and shows the improvement applied to a cook-stove. Fig. 2 is a part view, showing the oven-case in section at line $x\ x$, and the furnace in top view with part of the cover removed.

I will describe my improvement as applied to an ordinary cooking-stove or range; but the improvement is applicable to a broiler-furnace having no connection with a stove, but having independent connection with the chimney.

A represents a case, which may be circular or of any other form, and which is suited for setting upon the stove or range top A', over the pot-hole $A^2$ therein, whereby the draft of the chimney may be made available.

The case A is shown as closed at top with a cover, B, consisting of an outer ring, $b$, attached to the wall of the case, a contracting ring, $b'$, and a central pot-hole cover, $b^2$. When used for broiling these removable parts $b'\ b^2$ may be dispensed with, and the broiler put in their place.

Within the case A is the close-bottomed pan C, whose diameter is such as to leave flue-space D between the case and pan for the descent of products of combustion and vapors resulting from the broiling.

E is the fire-basket (for charcoal, coke, or other fuel) fitting the top of the pan C, leaving a space, F, between the bottom of the basket and the pan.

The air enters the space F by pipes G, extending through the walls of the case A and the pan C. There may be any desired number of these pipes. I prefer to use three, but do not confine myself to any special number. The course of the air and products of combustion is indicated by arrows.

From the space D the gases pass beneath the bottom $c$ of the pan and escape into the fire-space of the stove through the pot-hole $A^2$ when the apparatus is placed upon a stove, as shown; otherwise the gases would pass directly to the chimney by a suitable connection.

I do not show or claim any particular style of broiler, but prefer one to fit the top of case A, whatever the form of the top may be, and the broiler should have a cover.

H is a case which I prefer to make of tin or some bright metal that will check the escape of heat. This case is not necessarily used when broiling alone is being done, but provides a means for baking or warming any article whether broiling is going on or not. The case has a door, I, giving access to the upper part of the case and to the broiler.

J is an oven slide or shelf, and beneath this is a deflector, K, in the form of an inverted cone, to deflect the heat and rising currents of air from the center to the sides.

L is a concave reflector attached beneath the top to concentrate the heat upon any object upon the shelf or slide J. At M are holes for the admission of air into the oven-case H.

I claim as my invention—

1. The combination of case A, close pan C, fire-basket E, air-flue F, air-pipes G, extending through the walls of the case and pan C, and vertical smoke-flue D, between the pan C and case A, substantially as set forth.

2. The combination, with broiler-furnace A C E G, of the oven-case H, completely enveloping the furnace, to prevent the escape of heat and for the utilization of the same, substantially as shown.

3. In combination with the broiler-furnace A C E G, the oven-case H, containing the deflector-plates K L, substantially as and for the purpose set forth.

LYMAN B. PARKS.

Witnesses:
SAML. KNIGHT,
GEO. H. KNIGHT.